Sept. 12, 1967  J. WALLEN, JR  3,341,810
GUNSHOT DETECTOR SYSTEM
Filed April 27, 1965  2 Sheets-Sheet 1
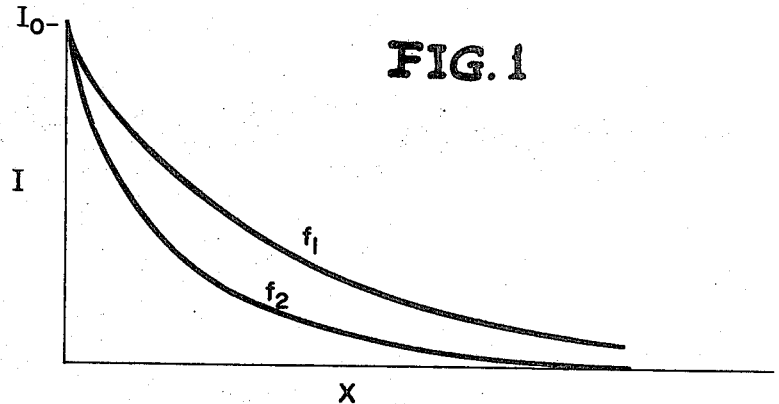
FIG. 1
FIG. 3
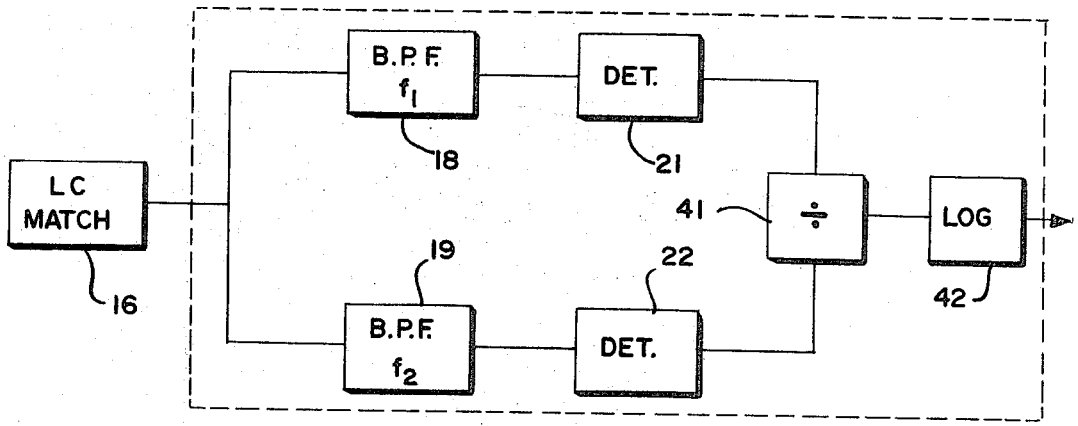
FIG. 4
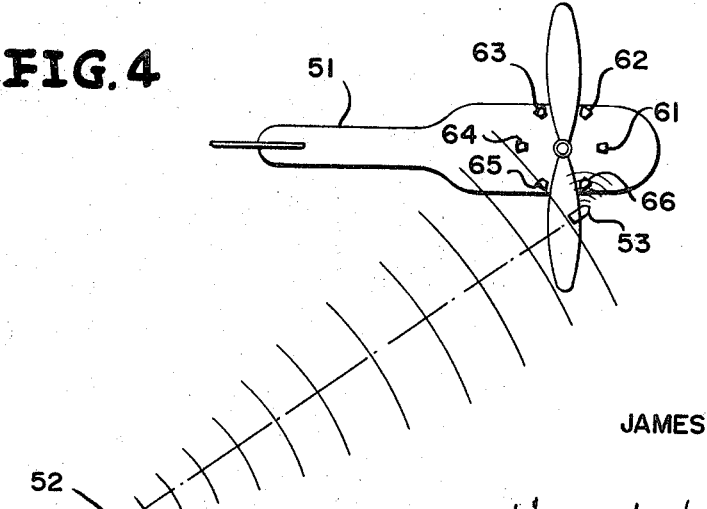
INVENTOR
JAMES WALLEN, JR.
BY *Hurwitz & Rose*
ATTORNEYS

United States Patent Office 3,341,810
Patented Sept. 12, 1967

3,341,810
GUNSHOT DETECTOR SYSTEM
James Wallen, Jr., Falls Church, Va., assignor to Melpar, Inc., Falls Church, Va., a corporation of Delaware
Filed Apr. 27, 1965, Ser. No. 451,211
15 Claims. (Cl. 340—16)

ABSTRACT OF THE DISCLOSURE

A system for detecting and distinguishing gun shot muzzle blasts and acoustic pressure waves of gun-launched projectiles passing in proximity to the target or other object in which the system is mounted by processing two disparate frequencies, preferably within the ultrasonic range to reduce effect of ambient noise, within the spectrum of frequencies produced by either wave source, in accordance with the principle that acoustic waves are attenuated as they travel through the atmosphere, in direct proportion to the values of their frequencies. Measurement of intensity of signal components at the two frequencies, and division of a related pair of such components, or subtraction of logarithms of a related pair, provides an indication of range of the wave source relative to the target. If the signal components of the detected frequencies are derived from the acousitic shock wave accompanying movement of a projectile closeby the target, a comparison of the intensities (amplitudes) of the two components of separated frequencies yields substantially no difference therebetween and is indicative of a near-miss projectile; whereas the muzzle blast, if detected by the system, typically occurs at such a distance from the target as to insure the existence of a substantial difference in intensities of the signal components, so that threshold levels may be ascertained and utilized to distinguish the two types of acoustic sources, or to indicate the existence of either source within a predetermined range. The use of a sufficient number of acoustic wave sensors disposed at various locations about the target or other object housing the system readily permits detection of direction from which the wave emanated.

The present invention relates generally to position indicators and, more particularly, to a position and range indicator relying upon the principle that certain wave sources in propagating through a medium have their high frequency components attenuated more than their low frequency components.

It can be shown that certain sources of wave energy in propagating through a medium are attenuated in accordance with:

$$I = I_0 e^{-kfx} \tag{1}$$

where

I is the amplitude of a wave of frequency $f$ at a distance $x$ from the source,
$I_0$ is the amplitude of the wave of frequency $f$ at the source,
$e$ is the base of natural logarithms, and
$k$ is a constant depending upon the propagation medium and the frequency of the wave of interest.

If the wave source is such that for two different frequencies, $f_1$ and $f_2$, emitted from it, the values of $I_0$ and $k$ are approximately identical, the amplitude of the wave components of frequency $f_1$ at a distance $x$ from the source is represented by:

$$I_{f_1} = I_0 e^{-kf_1 x} \tag{2}$$

and the amplitude of the wave components of frequency $f_2$ at a distance $x$ from the source of given by:

$$I_{f_2} = I_0 e^{-kf_2 x} \tag{3}$$

by dividing Equation 2 by Equation 3, we derive:

$$\frac{I_{f_1}}{I_{f_2}} = \frac{I_0 e^{-kf_1 x}}{I_0 e^{-kf_2 x}} = e^{kx(f_2 - f_1)} \tag{4}$$

Since $e$, $k$, $f_1$ and $f_2$ are all known or can be specified with particularity, Equation 4 provides an indication, in exponential terms, of the distance between a detector station that is responsive to frequencies $f_1$ and $f_2$ of the wave source of interest, and the source itself. By taking the logarithm of Equation 4, the exponential form of $x$ is converted into a direct linear relationship. The division operation of Equation 4, in addition to providing a direct relationship of distance between a wave source and a detection station, is admirably suited for range detection because there is no need to know the amplitude of the waves at the source.

The present invention relies upon the principles expressed by Equation 4 for detecting the range of a gun blast relative to a detection station. It has been found that the report of both the muzzle and projectile from any gun blast follows Equation 1 quite faithfully when $f$ is in excess of 500 cycles per second. Since the pressure wave amplitudes of components of a gun report at two different frequencies in the supersonic range are substantially equal, the expression set forth by Equation 4 is admirably suited for range detection in the present application.

The use of high frequencies for gun blast detection is also of considerable advantage when the invention is utilized in an environment having a high ambient noise level, such as exists for a hovering helicoper at which shots are being directed by ground troops. Since ambient noise, in such environments, is usually in a spectrum considerably below the ultrasonic range, interference between the detected supersonic gun blast report and the ambient noise is minimal. With use in a helicopter, the minimum detected frequency is 8,000 c.p.s., to avoid substantial interference between ambient noise and the gun reports.

The present invention, in use, relies upon the principles expressed in Equation 4 to provide information as to whether a particular pressure wave received at a detection station is indicative of muzzle or projectile blast. In a system for determining where a gun blast originated, this is imperative. Otherwise, it is impossible to distinguish, in many instances, the shock wave produced by a near-miss projectile from that produced by the muzzle blast. An operator of the system, if furnished only with the information obtained by detection of shock waves of projectiles passing closely, will erroneously direct his attention to that location rather than to the location of the gun from which the projectile was fired or launched. Since a person directing gun fire toward a target of the type with which the present invention will often be used, e.g., a helicopter, invariably is at least 100 feet from the target, and the bullet always passes within about 50 feet of the target, a decision is made on the basis of range as to whether the detected pressure wave is the result of a muzzle blast or the shock wave of a projectile.

Because the present invention operates at supersonic frequencies, the beam width of each transducer can be made to cover a relatively small sector of a circle. Thus, by employing a plurality of detectors, one for each sector, the direction angle and range of a gun shot can be determined with the present invention.

It is, accordingly, an object of the present invention to provide a new and improved apparatus useful in range detection.

Another object of the invention is to provide an indication of the range of a signal source by comparing the relative amplitudes of a pair of different frequencies detected in response to said source.

An additional object of the present invention is to provide a range indicating system relying on the principle that low frequency waves are attenuated less severely than high frequency waves in propagating through a medium.

Still another object of the present invention is to provide a new and improved system for distinguishing the muzzle and projectile reports from a gun blast.

A further object of the present invention is to provide a system for distinguishing between projectile and muzzle reports deriving from a gun blast wherein a muzzle indication is provided only if the distance between the detecting site and the originating point of the report exceeds a predetermined amount, and under such circumstances no projectile indication is provided.

Still another object of the present invention is to provide a new and improved gun blast detector adapted to function in extreme ambient noise environments.

The above and still further objects, features and advantages of the present invention will become apparent upon consideration of the following detailed description of one specific embodiment thereof, especially when taken in conjunction with the accompanying drawings, wherein:

FIGURE 1 illustrates plots of amplitude versus distance for two different frequencies of a gun blast;

FIGURE 3 is a block diagram of a modification of the system illustrated by FIGURE 2; and FIGURE 4 is a block diagram illustrating the manner in which a plurality of the detecting networks of FIGURE 2 or 3 is employed as a gun blast direction finder.

Figure 2:
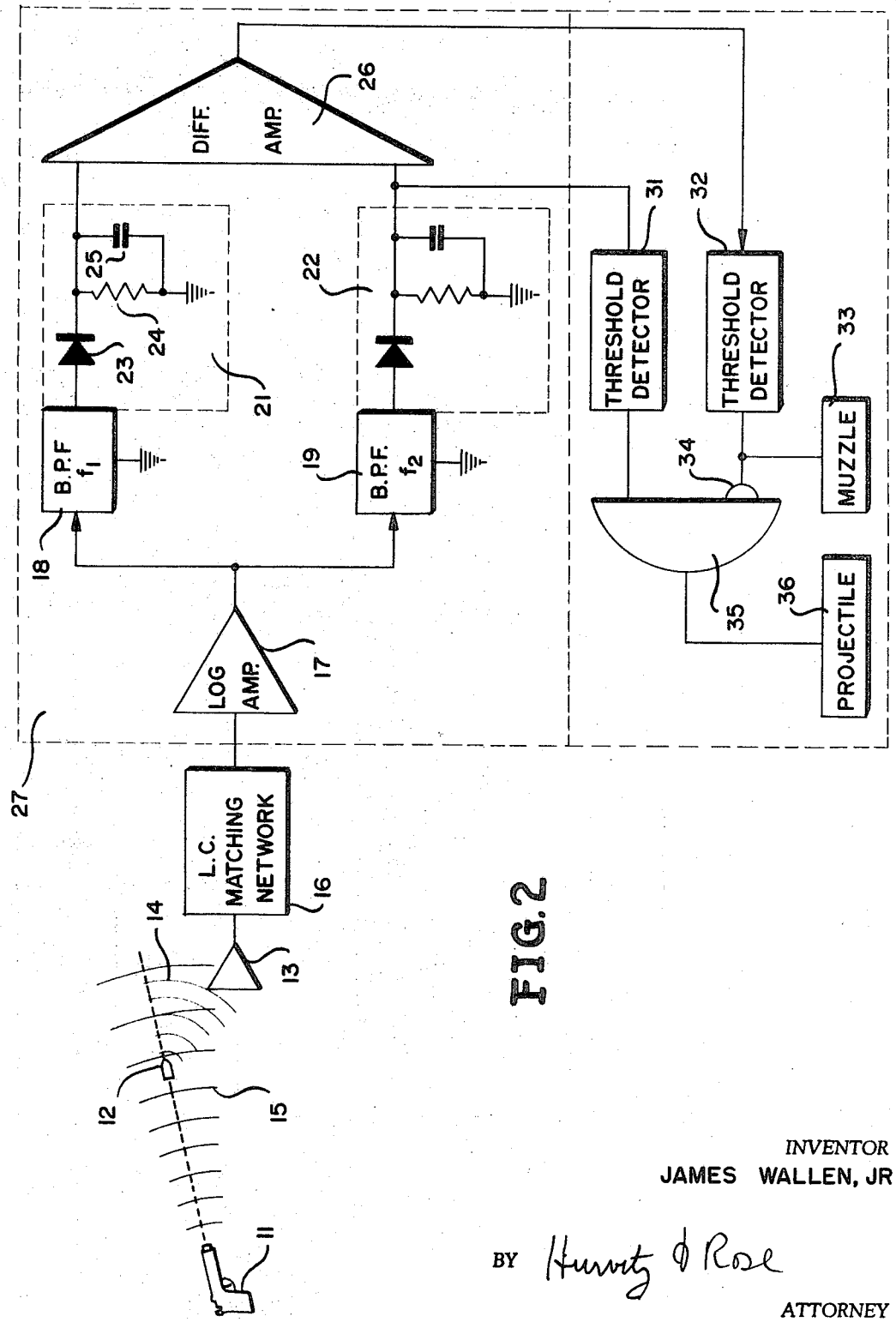
FIGURE 2 is a block diagram of a preferred embodiment of the present invention employed for detecting and distinguishing between muzzle and projectile reports.

Reference is now made to FIGURE 1 of the drawings which graphically depicts the envelope amplitude versus frequency and distance characteristics of a gun blast at two supersonic frequencies $f_1$ and $f_2$, for example, 35 kc. and 45 kc. It is noted from FIGURE 1 that the amplitude components $I_o$, of the source at both frequencies $f_1$ and $f_2$, are identical. As the distance $x$, from the source increases, the amplitude of the curve denoted by $f_2$ decreases more rapidly than the amplitude of the curve indicated by $f_1$. The ratio of the amplitudes of two curves at any distance $x$, from the source is given by Equation 4 supra. Thus, by dividing the signal amplitude at frequency $f_1$ by the signal amplitude at frequency $f_2$, an indication is provided of the distance $x$, from the source.

Since the functions denoted by curves $f_1$ and $f_2$ are both exponential, division can also be obtained if the logarithms of the components at frequencies $f_1$ and $f_2$ are taken. By taking the logarithm of each component and algebraically combining the resulting signals so their magnitudes are substracted, an indication of distance is directly provided. This can be seen by taking the logarithms of Equations 2 and 3 as:

$$\ln I_{f_1} = \ln I_o - kf_1 x \quad (5)$$

$$\ln I_{f_2} = \ln I_o - kf_2 x \quad (6)$$

By subtracting the expression on the right-hand side of Equation 6 from the expression on the right-hand side of Equation 5, we obtain:

$$\ln I_o - kf_1 x - \ln I_o + kf_2 x = (f_2 - f_1) kx \quad (7)$$

Since frequencies $f_1$ and $f_2$ can be designated into detection system according to the present invention, and $k$, the attenuation property of air for a gun blast, is approximately the same at the two supersonic frequencies selected, Equation 7 provides a direct indication of distance between a detecting station and the gun shot source.

The manner by which the mathematical expressions given by Equations 5–7 is employed in the present invention is seen by reference to FIGURE 2. In FIGURE 2, a gun 11, which may be a small arm, has fired from it a bullet 12 that passes in close proximity, less than 50 feet, from ultrasonic transducer 13. Transducer 13 has sufficient sensitivity to be responsive to both the projectile report 14 and muzzle report 15, if the projectile passes within 100 feet and the gun is fired within 1000 feet of the detector. For both types of reports, detector 13 derives considerable signal in the supersonic band at 35 kc. and 45 kc. At both of the frequencies specified, it can be shown that the pressure waves deriving from projectile 12 have approximately the same amplitudes and the waves from muzzle report of gun 11 also have about the same amplitudes. In addition, the attenuation constants for both frequencies are the same in the air through which the bullet travels into proximity with detector 13.

Connected to detector 13, which generally has a narrow beam width is an L.C. matching network 16. Matching network 16 has an inductance and capacitance selected so that the combined response from it and transducer 13 closely resembles a double tuned amplifier wherein the two peaks are approximately at 35 and 45 kc.

The output of matching network 16 is supplied to logarithmic amplifier 17 from which there are derived at frequencies $f_1$ and $f_2$ signal magnitudes in accordance with Equations 5 and 6. The $f_1$ signal deriving from amplifier 17 is separated from the $f_2$ component by means of parallel connected bandpass filters 18 and 19. Each of filters 18 and 19 is selected to pass the same energy content and has a bandpass on the order of one kc., with the center frequency of filter 18 being at 35 kc. while the center frequency of filter 19 is at 45 kc.

The signals deriving from filters 18 and 19 are separately detected by rectifying and integrating networks 21 and 22, respectively. Networks 21 and 22 are identical both having diodes 23 poled to pass only the positive half cycle of the A.C. wave deriving from their respective filters. The halfwave rectified wave at the cathodes of diodes 23 are integrated by the parallel combination of resistance 24 and capacitance 25, selected to have time constants on the order of one millisecond. The one millisecond time constant is selected because this is the approximate duration of a muzzle blast from gun 11.

Thus, there are derived from detecting networks 21 and 22 D.C. voltages having amplitudes proportional to the energy content at frequencies $f_1$ and $f_2$ of the gun blast detected by transducer 13, i.e. proportional to the expressions on the right-hand sides of Equations 5 and 6. Because there is a possibility of relative phase shift between the signals in propagating through filters 18 and 19 and because the two frequencies do not usually arrive at transducer 13 in phase, the amplitudes of the filtered waves are amplitude detected for analyzation purposes.

The outputs of detectors 21 and 22 are applied to differential amplifier 26 that derives a D.C. output voltage that is directly proportional to the expression given by the right-hand side of Equation 7. The output deriving from differential amplifier 26 is directly proportional to the distance between transducer 13 and projectile 12 or between the transducer and the location of gun 11, depending upon whether the muzzle or the projectile report is being sensed by transducer 13. Thus, all of the apparatus within block 27 may be considered as a range finding calculator.

To provide an indication as to whether the projectile or muzzle report is being sensed, the logic network of block 28 is provided. Network 28 includes two threshold detectors 31 and 32, respectively responsive to the outputs of detector 22 and differential amplifier 26. Threshold detector 31 is adjusted so that it provides a binary one output whenever the signal level deriving from detector 22 exceeds a predetermined level, which is a function of ambient noise. Whenever a muzzle or projectile report is picked up by transducer 13, a significant output is derived from detector 22. This output is above the ambient noise level in which the present invention is designed to operate and is reflected as a binary one output from threshold detector 31.

Threshold detector 32 is set to provide a binary one output when the signal deriving from differential amplifier 26 exceeds a predetermined level, indicative of a blast from muzzle 11 or a report from projectile 12 being greater than 50 feet from transducer 13. In actual practice, gun 11 is never fired at a distance less than 100 feet from transducer 13 and projectile 12 always passes within 50 feet of the transducer. Thereby, threshold detector 32 derives a binary one output only in response to a muzzle blast from fire arm 11 and never in response to a projectile report.

The signal deriving from threshold detector 32 is applied to muzzle indicator 33 whereby an operator employing the present invention is apprised of the fact that gun 11, within the beam width of transducer 13, has been fired. When such an indication is derived, the operator does not want to be advised that a projectile has passed close to transducer 13. In consequence, the binary one output of detector 32 is applied to the inhibit input 34 of inhibit gate 35. The other input to inhibit gate 35 is responsive to the binary one output of threshold detector 31. Thereby, if projectile 12 passes within 50 feet of transducer 13, a binary one output of detector 31 is coupled through gate 35 to projectile indicator 36 and no indication of muzzle report is derived.

If both the projectile and the muzzle report are in the beam width of transducer 13, indicators 33 and 36 are activated, indicator 36 being activated in response to projectile 12 passing within 50 feet of transducer 13 and muzzle indicator 33 being subsequently activated in response to the more distant muzzle report from gun 11 being received by the transducer. To apprise an operator of both indications, indicators 33 and 36 are provided with latching means in accordance with a manner well known to those skilled in the art. The latching circuit is necessary for indicator 36 because threshold detector 32 derives a binary one output in response to the muzzle report of gun 11. In response to the binary one output from detector 32, inhibit gate 35 does not pass the binary one output of the threshold detector 31. Since the time response of a human operator is not sufficiently fast to perceive signals deriving from indicators 33 and 36, a separate latching network must be provided for each of them. The latching networks can be either of the manual or time delay reset type.

Reference is now made to FIGURE 3 of the drawings wherein a modified form of the distance determining network 27 employed in FIGURE 2 is illustrated. The network of FIGURE 3 relies upon a more straight-forward application of principles involved in the present invention, as expressed by Equation 4. The output from L.C. matching network 16 is applied directly in parallel to bandpass filters 18 and 19 in the modified network. The AC signals deriving from filters 18 and 19 are rectified and detected in circuits 21 and 22 which provide DC signals in accordance with Equations 2 and 3, respectively. The signal deriving from detector 21 is divided by the signal output from detector 22 in analog computer division circuit 41, which may be of any of the well known types.

The DC output signal deriving from circuit 41 can be applied directly to threshold detector 32 or if additional sensitivity is desired, it can be coupled to the threshold detector through logarithmic amplifier 42. In the event that amplifier 42 is omitted, the output of divider 41 as applied to threshold detector 32 is expressed by the right-hand side of Equation 4. If logarithmic network 42 is employed, the input to detector 32 is in accordance with Equation 7. In either event, the threshold detector is calibrated so that it provides a binary one output for ranges in excess of 50 feet.

Reference is now made to FIGURE 4 of the drawings wherein it is illustrated how the detector of the present invention is employed in the extremely high sonic noise level of helicopter 51 having rotating blades. The detector is employed for sensing the direction of muzzle blast from gun 52 and the direction which projectile 53 passes the helicopter, phenomena that the helicopter operator cannot hear due to the high ambient noise level below 8000 c.p.s. On helicopter 51, there are provided six ultrasonic transducers equally spaced in a circular array to have non-overlapping beam widths. The beam widths of the different transducers are arranged, however, to cover completely the area in which helicopter 51 is hovering. Each of transducers 61–66 is connected to a different one of the detecting networks, such as illustrated in FIGURE 2.

When bullet 53 is fired from gun 52 towards helicopter 51, it is assumed to pass in close proximity (less than 50 feet) to the helicopter in the sector covered by the beam width of transducer 66. In consequence, a binary zero output is derived from threshold detector 32 while there is a binary one output from detector 31. The muzzle indicator 33 is not activated, thereby enabling gate 35 to pass the binary one output of detector 31 to projectile indicator 36. The helicopter operator is thus apprised of the fact that a projectile passed within 50 feet of transducer 66 looking out at 2 o'clock from the nose of the craft.

A fraction of a second subsequent to the report from projectile 53 being picked up by transducer 66, the muzzle report from gun 52 is detected by transducer 65. Because gun 52, when fired, can always be assumed to be in excess of 50 feet from the helicopter 51, (the enemy generally would be an easy target from the helicopter if he were closer), the circuit responsive to transducer 65 has its threshold detectors 31 and 32 activated to the binary one state. The one outputs from detectors 31 and 32 result in muzzle indicator 33 being activated to the exclusion of projectile indicator 36. In consequence, the helicopter operator is advised that projectile 53 has been fired from gun 52 that is located at 4 o'clock relative to the nose of the craft. He, therefore, directs his own gunfire toward the location encompassed by the beam width of transducer 65 or takes evasive action away from this area. He is not falsely informed that the muzzle report from gun 52 was in the beam width covered by transducer 66 that detected the projectile report. Because of the frequencies employed, there is also very little or virtually no likelihood of false muzzle or projectile report indications being derived, in response to the high subsonic noise level in which helicopter 51 is located.

While I have described and illustrated one specific embodiment of my invention, it will be clear that variation of the details of construction which are specifically illustrated and described may be resorted to without departing from the true spirit and scope of the invention as defined in the appended claims.

I claim:

1. A system for detecting the range of a wave source deriving approximately equal amplitudes, $I_o$, at two different frequencies $f_1$ and $f_2$, wherein waves from said source at frequencies $f_1$ and $f_2$ are attenuated as they propagate through a medium in accordance with:

$$I = I_o e^{-kfx}$$

where $I$ = amplitude of a transduced component of the wave at frequency $f$ at a distance $x$ from the source;
$e$ = constant; and
$k$ = constant of propagation that is approximately equal for $f_1$ and $f_2$;

comprising receiving means for transducing waves of frequencies $f_1$ and $f_2$ into two separate signals that are predetermined functions of the amplitudes of the waves at frequencies $f_1$ and $f_2$, and means responsive to said two signals for effectively dividing one signal by the other signal to derive an ouput that is a predetermined function of $x(f_2 - f_1)$, wherein said means for transducing includes means for deriving said two signals in proportion to the logarithms of the amplitudes of the $f_1$ and $f_2$ waves received at the means for transducing, and said means for effectively dividing comprises means for algebraically combining said two signals to derive said output as a signal level directly proportional to $(f_2-f_1)x$.

2. A system for detecting the range of a wave source deriving approximately equal amplitudes, $I_o$, at two different frequencies $f_1$ and $f_2$, wherein waves from said source at frequencies $f_1$ and $f_2$ are attenuated as they propagate through a medium in accordance with:

$$I = I_o e^{-kfx}$$

where $I$ = amplitude of the wave of frequency $f$ at a distance $x$ from the source;
$e$ = constant; and
$k$ = constant of propagation that is approximately equal for $f_1$ and $f_2$;

comprising receiving means for transducing waves having components $f_1$ and $f_2$ into a first signal having components at $f_1$ and $f_2$ proporational to the amplitudes of the waves of frequencies $f_1$ and $f_2$ as received at the transducing means, means responsive to said first signal for deriving a second signal proportional to the logarithm of the amplitude of the first signal, filter means having non-overlapping pass bands responsive to said second signal for deriving third and fourth signals proportional to the logarithms of the received signal at frequencies $f_1$ and $f_2$, respectively, and means for algebraically combining said third and fourth signals to derive an output directly proportional to the difference of the logarithms of the received amplitude components at frequencies $f_1$ and $f_2$.

3. A system for determining if a report detected at a station removed from a gun blast is the muzzle report or the projectile report comprising sound responsive transducing means for deriving a signal that is a replica of the gun blast report, means responsive to said transducing means for deriving a first signal indicative of the report being detected by said transducing means, means responsive to said transducing means for deriving a second signal indicative of the report being detected by said transducing means being in excess of a predetermined distance from said transducing means, means responsive to said second signal for deriving an indication of a muzzle report being received at said transducing means, and means responsive to said first signal and to the exclusion of said second signal for deriving an indication of a projectile report being received at said transducing means.

4. The system of claim 3 wherein said predetermined distance is on the order of fifty feet.

5. The system of claim 3 wherein the signal deriving from said transducing means includes frequency components wherein propagation between the reports and said transducing means are in accordance with:

$$I = I_o e^{-kfx} \quad (1)$$

where $I$ = amplitude of a transduced component of the wave at frequency $f$ at a distance $x$ from the source,
$I_o$ = amplitude of the wave of frequency $f$ at the source of the report,
$e$ = constant,
$k$ = constant of propagation, and
$x$ = distance between the report source and said transducing means;

said distance detecting means includes: means responsive to said transducing means for deriving third and fourth separate signals that are predetermined functions of the amplitudes of the transduced waves at two different frequencies $f_1$ and $f_2$, wherein $I_o$ is approximately the same for the waves of frequencies $f_1$ and $f_2$, and $k$ is approximately the same for $f_1$ and $f_2$, and means responsive to said third and fourth signals for effectively dividing one of them by the other.

6. A system for detecting the muzzle and projectile reports of gun blasts comprising a transducer for deriving a replica of the gun blast pressure wave, first and second filter means having non-overlapping pass bands separately responsive to the output of said transducer, the pass bands of said filter means being only in the spectrum of said blast pressure wave wherein amplitude decreases with increasing frequency, means for separately detecting the outputs of said filter means whereby said dectecting means responsive to the filter means having the higher pass band derives a lower amplitude signal than the other filter means for the same range between the pressure wave source and said detector, means responsive to the outputs of said detecting means for deriving a first signal when the difference between the relative amplitudes deriving from the detectors exceeds a predetermined level indicative of the pressure wave source being at least a predetermined distance from the transducer, means responsive to the output of one of said detectors for deriving a second signal when the output from said one detector exceeds a predetermined level indicative of reception of a gun blast pressure wave by said transducer, and means for deriving muzzle indicating signal in response to the occurrence of said first signal.

7. A system for indicating the direction from which a muzzle report and a projectile report emanated comprising a plurality of spaced pressure wave transducing means having substantially non-overlapping beam patterns radiating from a common point, means responsive to each of said transducers for deriving an indication of whether a sensed report is in response to a muzzle or projectile report, each of said indication deriving means including: means responsive to said transducing means for deriving a first signal indicative of a report being detected by said transducing means, means responsive to said transducing means for deriving a second signal indicative of the report being detected by said transducing means being in excess of a predetermined distance from said transducing means, means responsive to said second signal for deriving an indication of a muzzle report being received at said transducing means, and means responsive to said first signal and to the exclusion of said second signal for deriving an indication of a projectile report being received of said transducing means.

8. The system of claim 7 wherein said predetermined distance is on the order of fifty feet.

9. The system of claim 7 wherein the signal deriving from said transducing means derives frequency components wherein propagation between the report and said transducing means is in accordance with:

$$I = I_o e^{-kfx} \quad (1)$$

where $I$ = amplitude of the transduced components of the wave of frequency $f$ at a distance $x$ from the source,
$I_o$ = amplitude of the wave of frequency $f$ at a source of the report,
$e$ = constant,
$k$ = constant of propagation, and
$x$ = distance between the report source and said transducing means;

and said distance detecting means includes: means responsive to said transducing means for deriving third and fourth separate signals that are predetermined functions of the amplitudes of the transduced waves at two different frequencies $f_1$ and $f_2$, wherein $I_o$ is approximately the same for the waves of frequencies $f_1$ and $f_2$, and $k$ is approximately the same for the waves of frequencies $f_1$ and $f_2$, and means responsive to said third and fourth signals for effectively dividing one of them by the other.

10. Apparatus for detecting the occurrence and direction of origination of the muzzle blast of a gun and for distinguishing the muzzle blast from the acoustic pressure wave accompanying passage in proximity to said apparatus of the projectile launched from the gun, said apparatus comprising means responsive to acoustic waves having frequency components within a predetermined frequency band for conversion thereof to electrical signals of corresponding frequency components, means for extracting a pair of signal components of disparate predetermined frequencies within said band from each electrical signal, means for detecting the amplitude of each of the extracted signal components, means for comparing the detected amplitudes of a pair of concurrently processed signal components of said disparate frequencies, and means responsive to said comparison for respectively indicating whether the compared signal components are derived from the acoustic pressure wave accompanying said muzzle blast or from the acoustic pressure wave accompanying motion of the projectile.

11. The combination according to claim 10 wherein said conversion means comprises a plurality of electroacoustic transducers each arranged for preferential reception of waves incident from a different direction.

12. The combination according to claim 10 wherein said comparison means comprises means for subtracting the detected amplitudes of said pair of signal components, and wherein said means for indicating includes means responsive to the output level of said subtracting means for producing a further signal indicative of muzzle blast when said output level exceeds a predetermined threshold level.

13. The combination according to claim 12 wherein said means for indicating further includes means responsive to the detected amplitude of one of said concurrently processed signal components for generating another signal indicative of projectile near-miss when the last-named detected amplitude exceeds a further predetermined threshold level, and means responsive to concurrent generation of said signal indicative of muzzle blast for inhibiting said another signal.

14. The combination according to claim 10 wherein said band of frequencies is in the ultrasonic frequency range.

15. The combination according to claim 14 wherein said band of frequency lies between approximately 35 kc./s. and 45 kc./s.

References Cited

UNITED STATES PATENTS

| | | | |
|---|---|---|---|
| 2,488,587 | 9/1948 | Green | 340—16 |
| 2,966,657 | 12/1960 | Price | 340—16 |
| 3,056,958 | 10/1962 | Anderson | 343—112 |
| 3,129,424 | 4/1964 | Rabinow | 343—12 |
| 3,217,290 | 11/1965 | Sellman | 340—16 |

RODNEY D. BENNETT, *Primary Examiner.*

CHESTER L. JUSTUS, *Examiner*

R. A. FARLEY, *Assistant Examiner.*